United States Patent
Bhalotia et al.

(10) Patent No.: US 7,756,866 B2
(45) Date of Patent: Jul. 13, 2010

(54) METHOD AND APPARATUS FOR ORGANIZING DIGITAL IMAGES WITH EMBEDDED METADATA

(75) Inventors: Gaurav Bhalotia, Mountain View, CA (US); Amit Ganesh, San Jose, CA (US); Nikhil Gupta, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 307 days.

(21) Appl. No.: 11/206,426

(22) Filed: Aug. 17, 2005

(65) Prior Publication Data

US 2007/0043748 A1  Feb. 22, 2007

(51) Int. Cl.
*G06F 17/30* (2006.01)

(52) U.S. Cl. ............... 707/723; 707/724; 707/725; 707/732; 707/748

(58) Field of Classification Search ............... 707/3, 707/4, 104.1, 999.003, 999.007, 999.107
See application file for complete search history.

(56) References Cited

U.S. PATENT DOCUMENTS

| | | | |
|---|---|---|---|
| 6,389,181 B2 * | 5/2002 | Shaffer et al. ............... 382/305 |
| 6,396,963 B2 * | 5/2002 | Shaffer et al. ............... 382/305 |
| 6,757,684 B2 * | 6/2004 | Svendsen et al. ............. 707/10 |
| 6,904,160 B2 * | 6/2005 | Burgess ....................... 382/113 |
| 7,343,365 B2 * | 3/2008 | Farnham et al. ................ 707/1 |
| 7,461,094 B2 * | 12/2008 | Morris et al. ............... 707/200 |
| 2001/0046330 A1 * | 11/2001 | Shaffer et al. ............... 382/284 |
| 2002/0044690 A1 * | 4/2002 | Burgess ....................... 382/209 |
| 2003/0158855 A1 * | 8/2003 | Farnham et al. ............. 707/102 |
| 2004/0126038 A1 * | 7/2004 | Aublant et al. .............. 382/305 |
| 2005/0060299 A1 * | 3/2005 | Filley et al. ..................... 707/3 |
| 2005/0104976 A1 * | 5/2005 | Currans .................... 348/231.5 |
| 2005/0289111 A1 * | 12/2005 | Tribble et al. ................... 707/1 |
| 2006/0080286 A1 * | 4/2006 | Svendsen ...................... 707/3 |
| 2006/0087559 A1 * | 4/2006 | Huberman et al. ........ 348/207.1 |
| 2006/0158533 A1 * | 7/2006 | Brahmbhatt et al. ...... 348/231.2 |
| 2006/0187317 A1 * | 8/2006 | Montulli et al. .......... 348/231.5 |
| 2006/0259511 A1 * | 11/2006 | Boerries et al. ......... 707/103 R |
| 2007/0195373 A1 * | 8/2007 | Singh .......................... 358/302 |

* cited by examiner

*Primary Examiner*—Don Wong
*Assistant Examiner*—Thanh-Ha Dang
(74) *Attorney, Agent, or Firm*—Park, Vaughan & Fleming LLP

(57) ABSTRACT

One embodiment of the present invention provides a system that facilitates automatically organizing digital images using metadata which is embedded in the digital images. The system operates by receiving a digital image with embedded metadata, wherein the embedded metadata includes Global Positioning System (GPS) data. The system uses the embedded metadata, including the GPS data, to identify additional metadata associated with the digital image. The system then saves the digital image on a storage medium. In addition, the system saves the embedded metadata and the additional metadata on the storage medium in a searchable format.

22 Claims, 2 Drawing Sheets

METHOD AND APPARATUS FOR ORGANIZING DIGITAL IMAGES WITH EMBEDDED METADATA

BACKGROUND

1. Field of the Invention

The present invention relates to computer systems that manipulate digital images. More specifically, the present invention relates to a method and an apparatus for automatically organizing digital images using metadata which is embedded in the digital images.

2. Related Art

Digital imaging technology is rapidly improving, and the cost of digital cameras is continuing to decrease. Furthermore, digital cameras are now being embedded in many different devices, such as cell phones, Personal Digital Assistants (PDAs), and portable MP3 players.

In addition to the improvements in digital imaging technology, online photo sharing networks and online galleries are more prevalent than ever before. With these modern technologies, it is possible to take hundreds of pictures, view them, touch them up, and annotate them before making them available on a public server.

A significant problem with non-digital photography is not being able to see what the images look like until after the film is developed. With digital imaging, you can typically view the image that has been captured immediately after the photograph is taken. In addition, memory cards let users take many more pictures than traditional film based cameras, and each additional picture incurs little or no additional cost.

The biggest burden with digital photography is to organize and annotate the digital images. A photographer typically uploads the images and has to review each one to identify attributes, such as locations, events, and people or objects associated with the images.

Hence, what is needed is a method and an apparatus for organizing digital images without the problems described above.

SUMMARY

One embodiment of the present invention provides a system that facilitates automatically organizing digital images using metadata which is embedded in the digital images. The system operates by receiving a digital image with embedded metadata, wherein the embedded metadata includes Global Positioning System (GPS) data. The system uses the embedded metadata, including the GPS data, to identify additional metadata associated with the digital image. The system then saves the digital image on a storage medium. In addition, the system saves the embedded metadata and the additional metadata on the storage medium in a searchable format.

In a variation of this embodiment, the additional metadata includes an identifier for a location associated with the GPS data.

In a variation of this embodiment, the metadata includes a time at which the digital image was acquired, and the additional metadata includes a weather condition for a location associated with the GPS data at the time the digital image was acquired.

In a variation of this embodiment, using the embedded metadata to identify additional metadata involves querying a web service.

In a variation of this embodiment, using the embedded metadata to identify additional metadata involves performing a lookup in a Personal Information Manager (PIM) application.

In a further variation, the system queries a user's calendar information to identify additional metadata including an event associated with the digital image.

In a further variation, the system queries a user's contact information to identify additional metadata including a location associated with the digital image.

In a variation of this embodiment, using the embedded metadata to identify additional metadata involves performing a lookup in a custom dictionary.

In a variation of this embodiment, the system annotates the image with the additional metadata so that the additional metadata can be displayed to a user.

In a variation of this embodiment, the system uses the metadata to identify digital images that are similar to the digital image. Once similar digital images are identified, the system presents a user with annotations from the similar digital images as possible options to facilitate annotating the digital image.

In a further variation, presenting the user with annotations from the digital images involves presenting the user with annotations that have not been automatically generated.

In a variation of this embodiment, the system additionally facilitates browsing a collection of digital images organized by metadata.

In a variation of this embodiment, the system adds the digital image to a gallery of images that have metadata similar to the metadata from the digital image.

In a variation of this embodiment, the system uses the metadata to perform a dynamic lookup query to present a user with a collection of digital images.

In a further variation, performing the dynamic lookup query involves performing a join operation with the metadata.

TABLE 1 illustrates various possible browsing options in accordance with an embodiment of the present invention.

TABLE 2 illustrates various possible search queries in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Background

Figure 1:
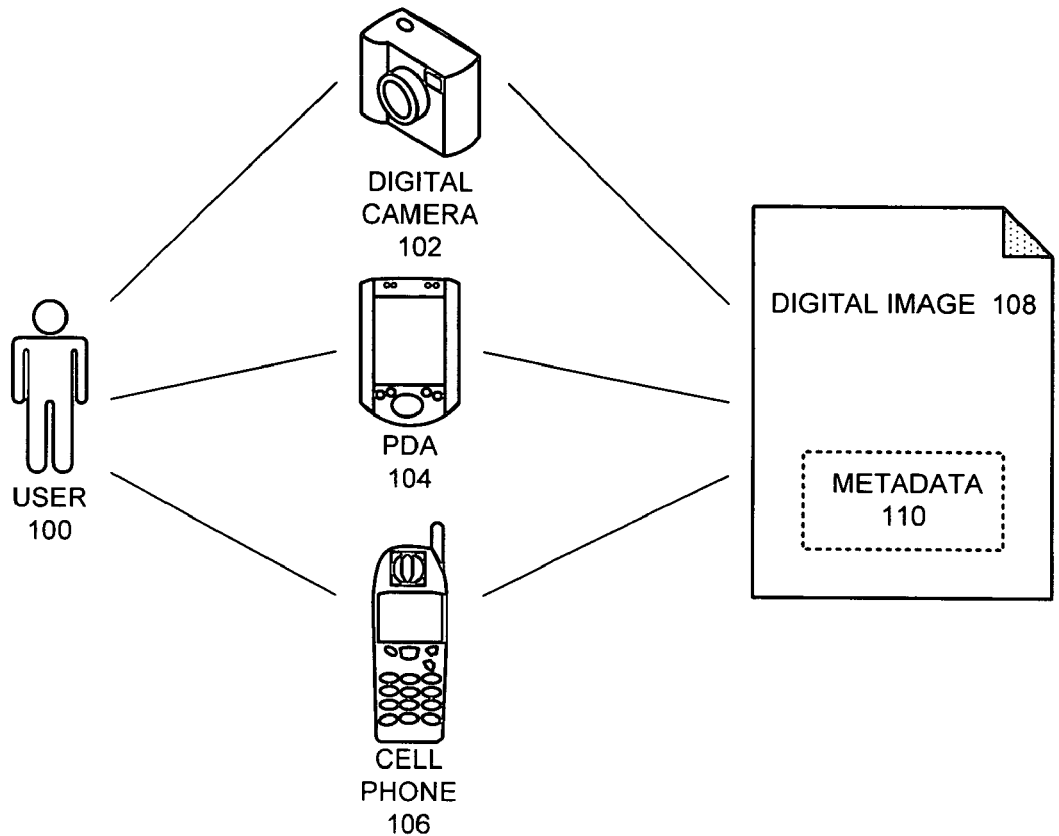
FIG. 1 illustrates digital imaging in accordance with an embodiment of the present invention.

FIG. 1 illustrates the digital imaging process in accordance with an embodiment of the present invention. During this process, digital images, such as digital image 108, are typically associated with metadata, such as the date the image was taken, the time the image was taken, the exposure settings, etc. For example, the metadata can be Exchangeable Image File Format (EXIF) data which is stored in Joint Photographic Experts Group (JPEG) images.

The addition of digital imaging technology and Global Positioning System (GPS) capabilities to cell phones 106 and Personal Digital Assistants (PDAs) 104 has enabled some additional metadata to be captured when the digital image 108 is taken. One embodiment of the present invention uses this GPS location information, along with other metadata 110 imbedded in the digital image 108 to organize, share, browse and search a collection of digital photographs on behalf of a user 100 or a group of users.

Currently, when an image is captured by a digital camera 102, the digital camera 102 typically stores metadata 110 in the image header, such as date the image was captured, time of the day the image was captured, camera make and model, exposure settings, ISO settings, etc. In addition to this metadata 110, in one embodiment of the present invention, location-specific information, such as the coordinates of the place where the photograph was taken and the altitude from which the image was taken is also stored in the embedded image metadata 110. Note that this is possible with current technology since it simply requires a GPS device to be embedded in a digital camera 102. Furthermore, cellular phones of today are equipped with both digital cameras and GPS technologies, and they are increasingly used as a primary camera device for many users. The newest generation of cellular phones has better imaging technology than ever before, and consequently, the number of users who use their phone as their primary camera continues to grow.

Organization

In one embodiment of the present invention, embedded metadata 110 can be used to auto annotate digital image 108 and organize digital image 108 with other digital images in a collection or albums. Note that in one embodiment of the present invention, digital images which are stored inside a database, such as an Oracle™ database, can be organized into collections through the use of database VIEWS over the image data.

The title or annotation for an individual image, such as digital image 108, can be generated by obtaining the name of the place where the photograph was taken either through a dictionary or by connecting to a service that maps coordinates to place names. For example, a service could map coordinates to terms such as "my office", "my backyard", or the Shoreline Amphitheater. Coupled with this time and date information, the system could generate a collection of images that have related times and dates, such as spring 2003 in Niagara Falls or winter 2002 in Alaska.

Yet another example provides a collection of all Alaska photos, or all photographs in 2003. In this example, the embedded date information is used to generate season/month and the location information.

Furthermore, the system can tag the photographs with information such as the weather at the time and location that the photograph was taken by. This can be accomplished by connecting to a weather service and obtaining the conditions at a particular time and place. Note that the present invention is not meant to be limited to the examples listed above. Virtually any combination of data from metadata 110 can be used to associate digital image 108 with other metadata that would be useful in annotating and organizing digital image 108.

Browsing

Digital images with embedded metadata coupled with the powerful indexing and integration features of a database can be used to provide a multi-dimensional access to the digital images. A system that organizes images into a simple file systems allows folder-based viewing of the images. In contrast, using a database to store images allows flexible menu-based viewing. Possible examples of menus are:

TABLE 1

All Images -> Year -> 2004 -> Months -> October;
All Images -> Year -> 2004 -> Seasons -> Fall;
All Images -> Location -> North America -> USA -> Niagara Falls;
All Images -> Time of the Day -> Sunset;
All Images -> Occasions -> Birthday (Note that this would require integration with a personal Information database);
All Aerial Images -> Location -> North America -> USA -> Death Valley.

Searching

The metadata stored with the images, along with the annotations generated while organizing the images, can be used to search over the image collections on behalf of a given user or a group of users. These searches can be based on keywords, or can be performed through a structured column based form, or a combination of the two. These searches can also be based on information from other sources, such as weather information, location information, occasion information, etc. Examples of some queries are:

TABLE 2

Niagara Falls;
All photographs within x miles of Eiffel Tower that have count greater than y (Can be used to find preferred tourist spots);
Fall photographs on highway 108 in Stowe, Vermont;
Sunset photographs on highway 1;
Britney Spears at Bali;
All photographs taken in 2001 (from personal collection);
Photographs taken in rain last year (links weather info to date).

Searching can also be performed on user-provided annotations that are stored along with the images in an object-relational database. For example, a query can find all photographs of Scooby Doo, if the photographs that contain the image of Scooby Doo are annotated with tag "Scooby Doo".

Sharing and Collaboration

Embedding location metadata into images facilitates a natural link between photographs taken by different users, which enables users to share annotations photographs taken at same location. These annotations can be additionally ranked by the number of other image attributes that match, such as year, time of day, weather conditions, etc. Users can enforce an additional constraint to obtain only those annotations that were not automatically generated. The system can then rank annotators based on number of people who select their annotations. This can increase the quality of the automatic suggestions that the system provides. Note that in one embodiment of the present invention, users do not need to upload their images to the service if they do not want to share the image. However, they can still share the annotations by simply uploading the image metadata.

Server Technology

In one embodiment of the present invention, the system can be generically implemented as a feature of an Object Relational Database. Metadata can be automatically populated for images stored in the database to facilitate subsequent retrieval, updates, and miscellaneous application support. This plus user-provided metadata can be used to provide virtual collections of objects in the database.

In another embodiment of the present invention, the database is modified to recognize and store implicit associations between objects through virtual joins based on metadata collected from various data sources, such as weather databases, GPS databases, and personal information database. In addition, the database can export a protocol through which public content (which is possibly indexed by a hosting service for collaboration and sharing) can be exposed. (This is similar to exposing text content to search engines).

Hosting Technology

In one embodiment of the present invention, the image search capability can be a part of an enterprise search application, as well as a stand-alone application. As part of an enterprise search application, the image search capability will provide users the capability to search through image files on the basis of typed in keywords. Each search result (image) can be appended with the list of virtual folders (albums) to which this image belongs. This allows the user to navigate to those albums to look for related images.

As a stand-alone application, the image search capability can provide search capability based on keywords similar to the enterprise search application discussed above. However, in this application, the user can also obtain an album view of the entire image collection. The user will then be able to modify the albums and the image metadata. Note that the image collection which is available to the user depends on the current credentials of the user, as well as the credentials associated with each image/album. For example if a user X is logged into the application and user Y has specified that, All the images in my public album are available to everyone, All the images in my album G-album are available to members of group G (of which X is a member), All the images in my album X-album are available to X.

Then, user X can view these three albums and the images contained in them. User Y can also specify which images/albums are view only and which can be modified by others. This stand alone application also provides the capability to be able to upload an image and to add keywords to an image, which will help facilitate subsequent searches.

Photo Database with Embedded Metadata

Figure 2:
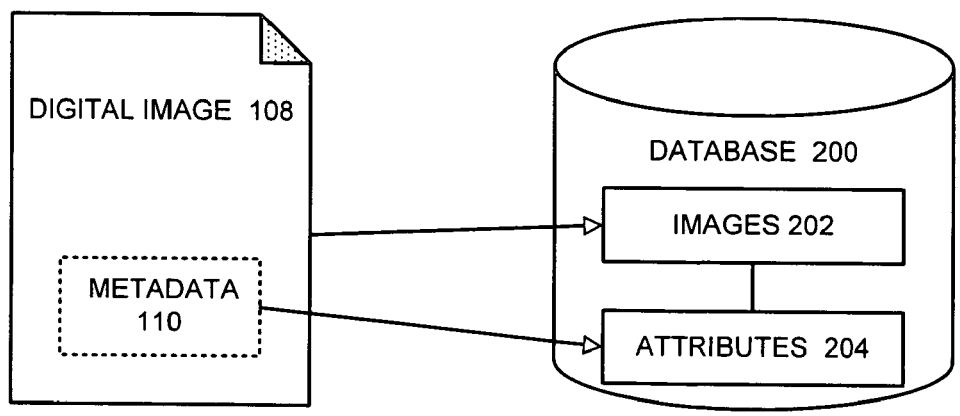
FIG. 2 illustrates a photo database with metadata in accordance with an embodiment of the present invention.

FIG. 2 illustrates a photo database 200 with metadata 110 in accordance with an embodiment of the present invention. Database 200 can include any type of system for storing data in non-volatile storage. This includes, but is not limited to, systems based upon magnetic, optical, and magneto-optical storage devices, as well as storage devices based on flash memory and/or battery-backed up memory. Database 200 includes images table 202 and attributes table 204. As images, such as digital image 108 are stored in images table 202, the associated metadata, such as metadata 110, is stored in attributes table 204. This facilitates indexing and fast retrieval of images from images table 202 via the associated metadata in attributes table 204.

Process of Storing Digital Images

Figure 3:
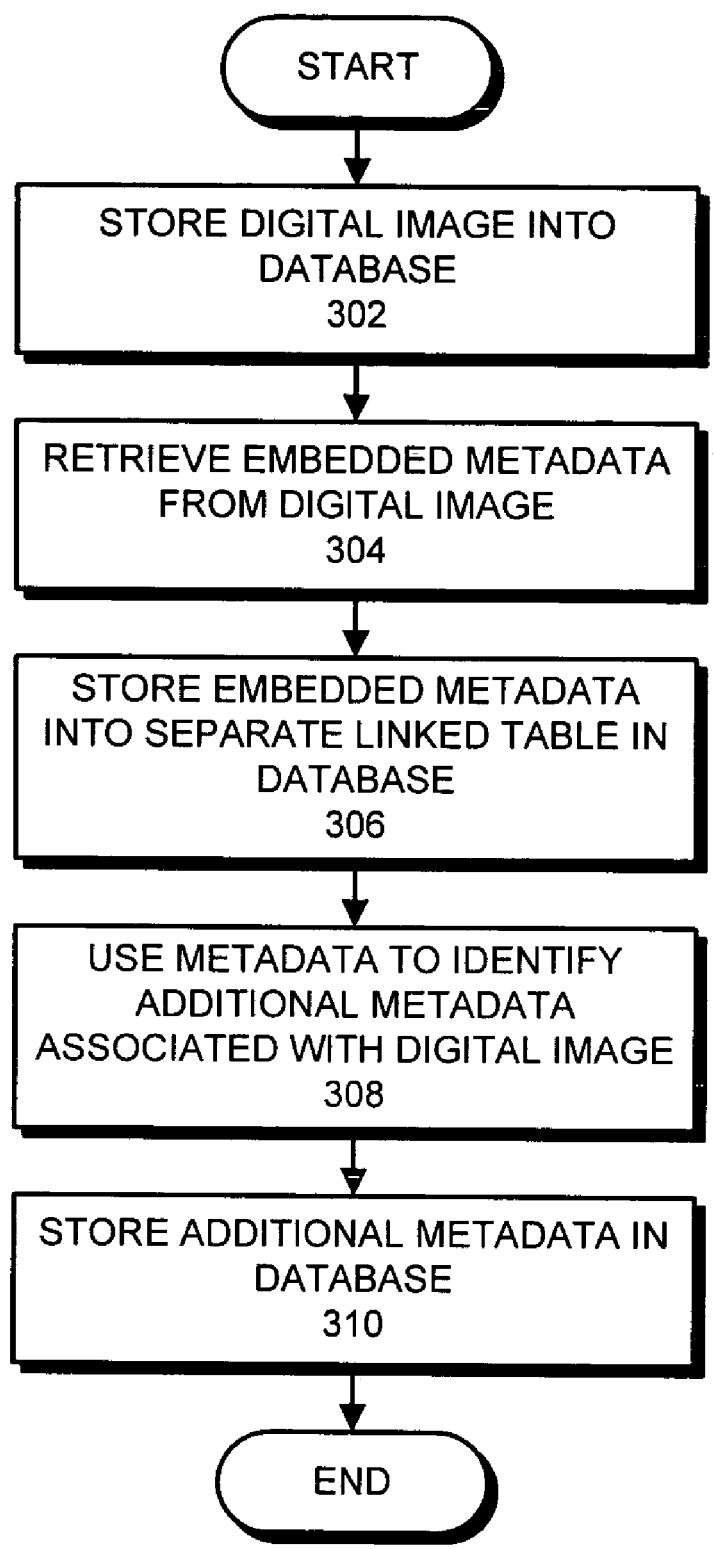
FIG. 3 illustrates the process of storing digital images in accordance with an embodiment of the present invention.

FIG. 3 illustrates the process of storing digital images in accordance with an embodiment of the present invention. The system starts when user 100 stores digital image 108 into images table 202 in database 200 (step 302). The system then retrieves embedded metadata 110 from digital image 108 (step 304) and stores metadata 110 in attributes table 204 (step 306).

The system also uses the metadata 110 to identify additional metadata associated with digital image 108 (step 308). Note that this could include connecting to a web service, querying a database, scanning a flat file, examining a PIM application, etc. For example, the system could lookup the name of a location associated with GPS coordinates in metadata 110. Finally, the system stores the additional metadata into database 200 (step 310). Note that it is not necessary to store the additional metadata in database 200, and the additional metadata can be identified at a later time. However, it may be necessary to store the additional metadata into database 200 to facilitate indexing and faster queries against the data a later time.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
  receiving a digital image with embedded metadata which includes Global Positioning System (GPS) data;
  identifying additional metadata associated with the digital image by performing a lookup in a Personal Information Manager (PIM) application, wherein the additional metadata includes a location name associated with the GPS data and contact information of a user;
  identifying, by a computer, using the embedded and additional metadata, one or more additional digital images taken by one or more different users, wherein the one or more additional digital images include annotations entered by the one or more different users, and wherein the annotations are not automatically generated;
  ranking, by the computer, the annotations from the one or more additional digital images based on a number of attributes of the one or more additional digital images that match the attributes of the received digital image, wherein the attributes include at least one of: temporal information, location information, or occasion information related to the corresponding digital image; and
  presenting the user with the annotations based on their ranking.

2. The computer-implemented method of claim 1, wherein the embedded metadata includes a time at which the digital image was acquired, and wherein the additional metadata includes a weather condition for a location associated with the GPS data at the specified time.

3. The computer-implemented method of claim 1, wherein identifying additional metadata further involves querying a web service.

4. The computer-implemented method of claim 1, further comprising querying calendar information of the user to identify additional metadata including an event associated with the digital image.

5. The computer-implemented method of claim 1, wherein identifying additional metadata further involves performing a lookup in a custom dictionary.

6. The computer-implemented method of claim 1, further comprising annotating the digital image with the additional metadata for display to the user.

7. The computer-implemented method of claim 1, wherein presenting the user with annotations based on their ranking further involves presenting the user with annotations that have not been automatically generated.

8. The computer-implemented method of claim 1, further comprising browsing a collection of digital images organized by metadata.

9. The computer-implemented method of claim 1, further comprising adding the digital image to a gallery of images having metadata similar to the metadata associated with the digital image.

10. The computer-implemented method of claim 1, further comprising using the metadata to perform a dynamic lookup query to present the user with a collection of digital images.

11. The computer-implemented method of claim 10, wherein performing the dynamic lookup query involves performing a join operation with the metadata.

12. A computer-readable storage medium storing instructions that when executed by a computer cause the computer to perform a method, the method comprising:
   receiving a digital image with embedded metadata which includes Global Positioning System (GPS) data;
   identifying additional metadata associated with the digital image by performing a lookup in a Personal Information Manager (PIM) application, wherein the additional metadata includes a location name associated with the GPS data and contact information of a user;
   identifying, by a computer, using the embedded and additional metadata, one or more additional digital images taken by a one or more different users, wherein the one or more additional digital images include annotations entered by the one or more different users, and wherein the annotations are not automatically generated;
   ranking, by the computer, the annotations from the one or more additional digital images based on a number of attributes of the one or more additional digital images that match the attributes of the received digital image, wherein the attributes include at least one of: temporal information, location information, or occasion information related to the corresponding digital image; and
   presenting the user with the annotations based on their ranking.

13. The computer-readable storage medium of claim 12, wherein the metadata includes a time at which the digital image was acquired, and wherein the additional metadata includes a weather condition for a location associated with the GPS data at the specified time.

14. The computer-readable storage medium of claim 12, wherein using the embedded metadata to identify additional metadata further involves querying a web service.

15. The computer-readable storage medium of claim 12, wherein the method further comprises querying calendar information of the user to identify additional metadata including an event associated with the digital image.

16. The computer-readable storage medium of claim 12, wherein using the embedded metadata to identify additional metadata further involves performing a lookup in a custom dictionary.

17. The computer-readable storage medium of claim 12, wherein the method further comprises annotating the image with the additional metadata for display to the user.

18. The computer-readable storage medium of claim 12, wherein presenting the user with annotations from the digital images further involves presenting the user with annotations that have not been automatically generated.

19. The computer-readable storage medium of claim 12, wherein the method further comprises browsing a collection of digital images organized by metadata.

20. The computer-readable storage medium of claim 12, wherein the method further comprises adding the digital image to a gallery of images having metadata similar to the metadata associated with the digital image.

21. The computer-readable storage medium of claim 12, wherein the method further comprises using the metadata to perform a dynamic lookup query to present the user with a collection of digital images.

22. An apparatus that is configured to automatically organize digital images using metadata which is embedded in the digital images, comprising:
   a processor;
   a memory;
   a receiving mechanism configured to receive a digital image with embedded metadata which includes Global Positioning System (GPS) data;
   a first identification mechanism coupled to the processor and configured to identify additional metadata associated with the digital image by performing a lookup in a Personal Information Manager (PIM) application, wherein the additional metadata includes a location name associated with the GPS data and contact information of a user;
   a second identification mechanism configured to identify, using the embedded and additional metadata, one or more additional digital images taken by one or more different users, wherein the one or more additional digital images include annotations entered by the one or more different users, and wherein the annotations are not automatically generated;
   a ranking mechanism configured to rank the annotations from the one or more additional digital images based on a number of attributes of the one or more additional digital images that match the attributes of the received digital image, wherein the attributes include at least one of: temporal information, location information, or occasion information related to the corresponding digital image; and
   a presentation mechanism configured to present the user with the annotations based on their ranking.

* * * * *

UNITED STATES PATENT AND TRADEMARK OFFICE
CERTIFICATE OF CORRECTION

| | | |
|---|---|---|
| PATENT NO. | : 7,756,866 B2 | Page 1 of 1 |
| APPLICATION NO. | : 11/206426 | |
| DATED | : July 13, 2010 | |
| INVENTOR(S) | : Gaurav Bhalotia et al. | |

It is certified that error appears in the above-identified patent and that said Letters Patent is hereby corrected as shown below:

In column 7, line 45, in claim 12, delete "by a one" and insert -- by one --, therefor.

In column 8, line 30, in claim 22, after "apparatus" delete "that".

Signed and Sealed this
Nineteenth Day of April, 2011

David J. Kappos
*Director of the United States Patent and Trademark Office*